United States Patent
Allen et al.

(10) Patent No.: US 6,743,504 B1
(45) Date of Patent: Jun. 1, 2004

(54) CO-CURED COMPOSITE STRUCTURES AND METHOD OF MAKING THEM

(75) Inventors: Gregory A. Allen, Highland, CA (US); David J. Belisario, Riverside, CA (US)

(73) Assignee: Rohr, Inc., Chula Vista, CA (US)

(*) Notice: Subject to any disclaimer, the term of this patent is extended or adjusted under 35 U.S.C. 154(b) by 76 days.

(21) Appl. No.: 09/797,286

(22) Filed: Mar. 1, 2001

(51) Int. Cl.$^7$ .................................. B32B 1/08
(52) U.S. Cl. ............... 428/362; 428/35.7; 428/36.1; 428/36.9; 428/188; 52/793.1
(58) Field of Search ............... 428/116, 119, 428/121, 73, 72, 35.7, 188, 34.1, 36.1, 36.2, 36.9; 52/793.1

(56) References Cited

U.S. PATENT DOCUMENTS

| | | | |
|---|---|---|---|
| 4,395,450 A | * | 7/1983 | Whitener |
| 5,061,418 A | | 10/1991 | Ware |
| 5,089,328 A | | 2/1992 | Doerer et al. |
| 5,135,799 A | | 8/1992 | Gross et al. |
| 5,186,999 A | | 2/1993 | Brambach |
| 5,234,757 A | | 8/1993 | Wong |
| 5,284,702 A | | 2/1994 | Umemoto et al. |
| 5,332,178 A | * | 7/1994 | Williams |
| 5,338,594 A | | 8/1994 | Wang et al. |
| 5,445,861 A | | 8/1995 | Newton et al. |
| 5,469,686 A | * | 11/1995 | Pykiet |
| 6,288,170 B1 | * | 9/2001 | Waid |

* cited by examiner

Primary Examiner—Deborah Jones
Assistant Examiner—Wendy Boss
(74) Attorney, Agent, or Firm—Goodwin Procter LLP (57) ABSTRACT

A composite structure has composite skin layers and at least two elongated stiffener/spacer composite members interposed between the skin layers. The stiffener/spacer composite members are arranged generally longitudinally of the skin layers in spaced-apart relation laterally. Each of the skin layers is formed by assembling a layer of an uncured resin-impregnated fiber material on a forming surface of a jig. Each stiffener/spacer composite member is formed of an uncured resin-impregnated fiber material that is laid up over an elongated hollow mandrel of a stiffened fabric and is assembled to one of the uncured skin layers. The jigs are juxtaposed to form a sandwich with the assembled uncured composite layers, which are then vacuum-bagged and co-cured under a predetermined pressure and a predetermined temperature to render the structure unitary.

43 Claims, 4 Drawing Sheets

CO-CURED COMPOSITE STRUCTURES AND METHOD OF MAKING THEM

BACKGROUND OF THE INVENTION

1. Field of the Invention

The present invention relates generally to the field of composite structures and, more particularly but not by way of limitation, to composite structures having skins separated and stiffened by hollow hats, each of which incorporates an integral co-cured fly away hollow mandrel used in laying up and curing the structure.

2. Prior Art

There is a growing trend in the aerospace industry to expand the use of advanced composite materials for a diverse array of structural and dynamic aerostructural applications because of the strength-to-weight advantage provided by composite materials. One particular application for the use of such advanced composite materials, such as graphite or an aromatic polyamide fiber of high tensile strength that are embedded in a resinous matrix, e.g., an epoxy, is for airfoil structures that are composed of skins separated and stiffened by a honeycomb core material. In the instance of an aerospace article such as a fan cowl, one or more stiffening members are affixed to the outer skin and covered with an inner skin for efficiently transmitting and/or reacting axial and/or bending loads to which the fan cowl is subjected.

There are two techniques currently employed for bonding through autoclave processing a composite stiffening member in combination with composite face layers: (1) the secondary bonding method, and (2) the co-cured bonding method. Both methods are disadvantageous in requiring costly non-reusable tooling and/or costly and tedious manufacturing steps.

A typical composite sandwich panel intended for use as an aerostructure part is normally fabricated using two autoclave-cured inner and outer composite skins that are formed by using a curing cycle with heat, pressure, and a unique tool for each skin. A sandwich panel is then made up using a composite bond jig, tool or fixture with the pre-cured face skin laid-up on the bond jig tool followed by a ply of film adhesive. A honeycomb aluminum or non-metallic core of a given thickness is placed on the face skin, another ply of film adhesive is applied, and finally the previously pre-cured inner skin is placed on the adhesive film. The bond jig that is used to fabricate the sandwich panel is usually the same tool that was used to create the outer composite skin. A plurality of closure plies of uncured composite material are laid up. Next, the assembled sandwich panel is cured during its final assembly stage. The entire sandwich panel is then vacuum bagged to the composite bond jig and again cured in an autoclave under high pressure and heat.

Thus, at least three very expensive and labor intensive fabrication and cure cycles have gone into the production of the exceptionally strong and lightweight composite honeycomb core sandwich panel. At least two different and expensive tools are needed in this process. Manufacturing flow time is very long, energy use is high, and the manufacturing floor space required is considerable.

The second method referred to above, the co-curing method, involves curing the composite inner and outer skins that are laid up with a layer of adhesive film and honeycomb core in one cure cycle in the autoclave. A co-cured panel is desirable in that it is less expensive to fabricate—only one bond jig tool is required, only one cure cycle is needed, the method is less labor-intensive, less floor space is required, and a much shorter manufacturing flow time is achieved. However, co-curing an aerostructure panel has never achieved wide-spread acceptance because of a large loss of panel strength and integrity, which is due to the lack of compaction of the composite plies placed over and under the honeycomb core. The composite plies dimple into the center of each core cell with nothing but the cell walls to compact the composite skins. The only way to overcome this "knockdown" characteristic is to add extra plies, which creates both unwanted weight and added cost. Thus, because of these constraints co-cured aerostructure panels are not widely manufactured in the aerospace industry.

There are other particular problems when a honeycomb core element is used to provide a stiffening element for an aerospace component. As Hartz et al. have described in U.S. Pat. No. 5,604,010 concerning a "Composite Honeycomb Sandwich Structure," with a high flow resin system large amounts of resin can flow into the core during the autoclave processing cycle. Such flow robs resin from the laminate, introduces a weight penalty in the panel to achieve the desired performance, and forces over-design of the skin plies to account for the resin losses to the honeycomb core. To achieve the designed performance and the corresponding laminate thickness, additional plies are necessary with resulting cost and weight penalties. Because the weight penalty is severe in terms of the impact on vehicle performance and costly in modern aircraft and because the resin flow is a relatively unpredictable and uncontrolled process, aerospace design and manufacture dictates that flow into the core be eliminated or significantly reduced. In addition to the weight penalty from resin flow to the core, it has been learned that micro-cracking that originated in the migrated resin can propagate to the bond line and degrade mechanical performance. Such micro-cracking potential has a catastrophic threat to the integrity of the panel and dictates that flow be eliminated or at least controlled.

Unfortunately, the use of a honeycomb core as a stiffener for elements in a aerostructure component, such as a structural panel, has other deleterious effects. Two of the greatest drawbacks to an aluminum core are its inherent significant cost and susceptibility to corrosion. To minimize galvanic corrosion of the core caused by contact with the face skins, isolating sheets are interposed between the aluminum core and the face skins. Also, the aluminum core is expensive and also must be machined to a desired shape in a costly process. The honeycomb core may also be subject to crush during manufacture, which imposes a limit on the pressures that may be used in autoclave processing. Thus, the processing of an aerospace advanced composite article is limited to an autoclave pressure of not greater than 45 psi, rather than a higher pressure that would increase the strength of the resultant advanced composite article. Also, the honeycomb core, if damaged in use, has a spring-back property, which makes the detection of such damage more difficult.

In providing reinforcing mandrels for stiffener elements, such as hat sections, for aerospace advanced composite structural panels, it is also known to provide a composite stiffening member in the form of a polyamide foam mandrel fabricated by machining a core mandrel to a desired shape. Obviously, the machining of the core mandrel is expensive and time consuming and further introduces the problem of properly bonding the core mandrel to the inner and outer skins.

Therefore, a great need has arisen for a practical method of readily producing stiffened, fiber-reinforced composite structures useful in the construction of integrally stiffened components for aerospace applications, which are cost and labor efficient and which save time in the fabrication process.

Accordingly, it is an object of the present invention to provide a method for fabricating aerostructure advanced composite articles that eliminates a honeycomb core as a spacing and stiffening element, provides a lighter weight assembly, and is easier to repair. Another object of the present invention is to reduce the lay-up cost of known advanced composite co-cure assemblies by at least 15% and to increase assembly strength over previously known co-cure assembly methods by being able to utilize high pressures in autoclave processing. Yet another object of the present invention is to improve the quality of co-cured advance composite assemblies and thereby increase customer satisfaction. A further object of the present invention is to provide a process that provides an assembly that can be manufactured in one manufacturing cell from raw material to final product. Yet another object of the present invention is to reduce the cost of post-bond and final assembly work for the final co-cured assembly, which assembly will readily indicate damage to an improved stiffening element.

The foregoing discussion covers some of the more significant objects of the invention. Those objects should be construed to be merely illustrative of some of the more prominent features and applications of the present invention. Many other beneficial results can be attained by applying the invention in a different manner or by modifying the invention within the scope of the disclosure. Accordingly, other objects and a fuller understanding of the invention may be had by referring to the summary of the invention and the detailed description of the preferred embodiments in addition to the scope of the invention defined by the claims taken in conjunction with the accompanying drawings.

SUMMARY OF THE INVENTION

The foregoing objects are attained, in accordance with one aspect of the present invention, by a composite structure having first and second composite skin layers, each of a resin-impregnated fiber material, and two or more elongated stiffener/spacer composite members, each of a resin-impregnated fiber material and interposed between the skin layers. The stiffener/spacer composite members are arranged generally longitudinally of the skin layers in spaced-apart relation laterally. Each stiffener/spacer composite member has side walls extending between and united with the skin layers by base walls that are bonded to the inner faces of the skin layers. An elongated hollow mandrel of a stiffened fabric is received between and in engagement with the side walls of each the of the stiffener/spacer composite members, the mandrel serving as a form for shaping the stiffener/spacer composite member. The composite layers are co-cured under a predetermined pressure and a predetermined temperature to render the structure unitary.

As will be more readily apparent from the description below, the composite structure of the present invention provides very strong sandwich aerostructures having co-cured skins and either hat-shaped or box-shaped tubular stiffener/spacers connecting the skins. The presence of the hollow mandrels, which enable the stiffener/spacers to be laid up from uncured resin-impregnated fiber material and assembled with the skin layers of likewise uncured composite skin layers, avoids the use of honeycomb cores and other costly core materials in the aerostructure and in addition to reducing costs allows significant weight savings.

The hollow mandrels also leave open spaces within the stiffener/spacer members, which facilitate installing connectors, fittings, hydraulic lines and electric wiring within the structures. The side walls and the base walls of the stiffener/spacer members stiffen the skins and provide considerable versatility in the structural and aerodynamic design of the composite structure.

The stiffener/spacer composite members may be generally hat-shaped in cross section with a generally U-shaped body portion, the legs of which form the walls, and a side flange portion forming one of said base walls extending from the end of each of the side walls of the U-shaped body portion. Alternatively, the stiffener/spacer composite members may be tubular with the side walls joined by at least one of the base walls. The tubular stiffener/spacer composite members may have a generally U-shaped body portion and inturned flange portions forming one of the base walls. The inner edges of the flange portions may meet at a butt joint or form a gap. Tubular stiffener/spacer composite members may also be formed by helical plies of composite material wrapped around the mandrel. Each hollow mandrel is, preferably, formed of a unitary stiffened carbon fabric tape.

Variations of the placement and geometry of the hollow mandrels permit the composite structure to be of various shapes and of various structural forms. One or more of the stiffener/spacer composite members may be of uniform cross section along at least a portion or the entirety of its length. One or more of the stiffener/spacer composite members may be of non-uniform cross section along at least a portion or the entirety of its length.

At least a portion of one or more of the stiffener/spacer composite members may have a longitudinal axis that is curved. The width of one or both base walls of one or more of the stiffener/spacer composite members may vary along at least a portion or along the entirety of its length. Similarly, the heights of the side walls of the stiffener/spacer composite members may be the same or they may be different along at least portions or along the entireties of their lengths. The stiffener/spacer members may be parallel or they may converge longitudinally along at least portions or along the entireties of their lengths.

The foregoing variations in the cross-sectional and longitudinal geometries and placements of the stiffener/spacer members permit the skin layers to be flat or partly or fully curved in either the lateral or the longitudinal direction or both and to be spaced apart at constant or varying distances.

In a particularly useful configuration for aerostructures forming airfoils, the top and bottom skin layers may meet and be in engagement at a longitudinal edge juncture. Advantageously, an elongated composite member of wedge shape in cross section and of a resin-impregnated fiber material is received between and engaged with portions of the top and bottom skin layers adjacent the edge juncture.

According to another aspect of the present invention, a method is provided for fabricating a composite structure from fiber-reinforced composite materials that includes the steps of assembling on a forming surface of a first jig a first uncured composite skin layer of a resin-impregnated fiber material, assembling on a forming surface of a second jig a second uncured composite skin layer of a resin-impregnated fiber material, and providing first and second elongated hollow mandrels, each hollow mandrel being of a stiffened fabric and having a predetermined shape in cross section. A stiffener/spacer composite member of an uncured resin-impregnated fiber material is assembled over each mandrel to form side walls and base walls. Each assembly of a stiffener/spacer composite member over a mandrel is combined with one of the skin members such that one of the base walls is in engagement with that skin member. The jigs are then juxtaposed in opposed relation to form a sandwich of the skin layers and stiffener/spacer composite members between the jigs. A hollow vacuum tube bag is placed into each mandrel and into the space between the side walls of the stiffener/spacer members assembled over the hollow mandrels. A vacuum bag is placed over the first jig and the sandwich. The tube bags are sealed to the vacuum bag, the second jig and each other in a manner such as to permit the hollow tube bags to communicate with the exterior of the vacuum bag. The vacuum bag is evacuated and the sandwich is subjected to a cycle of predetermined pressure and temperature to cure the resin-impregnated fiber materials of the composite skin layers and the stiffener/spacer composite members.

The method of the invention has the distinct advantage of allowing the structures forming the sandwich to be laid up in the uncured states and co-cured—separate curing of the skin layers, followed by combining the skin layers with a core structure and a second curing step, is avoided, with significant time, cost and energy savings. The mandrels used as forms for laying up the stiffener/spacer members can be provided in a wide variety of shapes and allow the fabrication of composite sandwich structures with the features described above.

In preferred embodiments of the method, each hollow mandrel is formed of a unitary stiffened carbon fabric tape that is spirally arranged to extend longitudinally and to provide a predetermined cross section.

It is highly advantageous to cure the sandwich using vacuum-bagging technology, as described generally above, which allows curing under pressures above about 45 psi, and preferably of about 70 psi, to compress the layers during curing for enhanced strength of the structure. When the vacuum-bagged jigs and sandwich of composite skins and stiffener/spacer composite members are placed in an autoclave for curing, the elevated pressure is exerted externally on the main vacuum bag on one side of the sandwich and on the jig on the other side of the sandwich and internally within each of the vacuum tube bags. The pressure acting internally on the top and bottom walls of the tube bags compresses the skin layers and the base walls of the stiffener/spacer composite members against the inner forming surfaces of the jigs. The pressure acting internally on the Bide walls of the vacuum tube bags compresses the side walls of the stiffener/spacer members. One of the beauties of the vacuum-bagging technique as applied in the present invention is that the opposite layers of the composite material are subjected to equal pressure, so there is no tendency to deform the layers. Stability of the side walls of the stiffener/spacer members, which are not backed up by conventional rigid "form" elements, is aided during autoclaving by the hollow mandrels.

Following the cure cycle the jigs and co-cured sandwich are removed from the autoclave, and the main vacuum bag and the vacuum tube bags are removed. The structure may then be trimmed as desired.

As mentioned above, the stiffener/spacer members may be hat-shaped in cross-section. In that case, a mandrel is first secured to one of the skin layers by an uncured adhesive, which upon curing bonds the mandrels to the portions of the skins to which they are adhered. The stiffener/spacer composite layer is then assembled over the mandrel. Tubular stiffener/spacer composite members may be laid up on the mandrels and then assembled as a unit to one of the composite skin layers.

The foregoing description has outlined rather broadly some features and advantages of the present invention. The detailed description of embodiments of the invention that follows will enable the present invention to be better understood and the present contribution to the art to be more fully appreciated. Those skilled in the art will recognize that the embodiments may be readily utilized as a basis for modifying or designing other structures and methods for carrying out the purposes of the present invention. All such structures and methods are intended to be included within the spirit and scope of the invention as set forth in the appended claims.

DESCRIPTION OF THE EMBODIMENT

Figure 1:
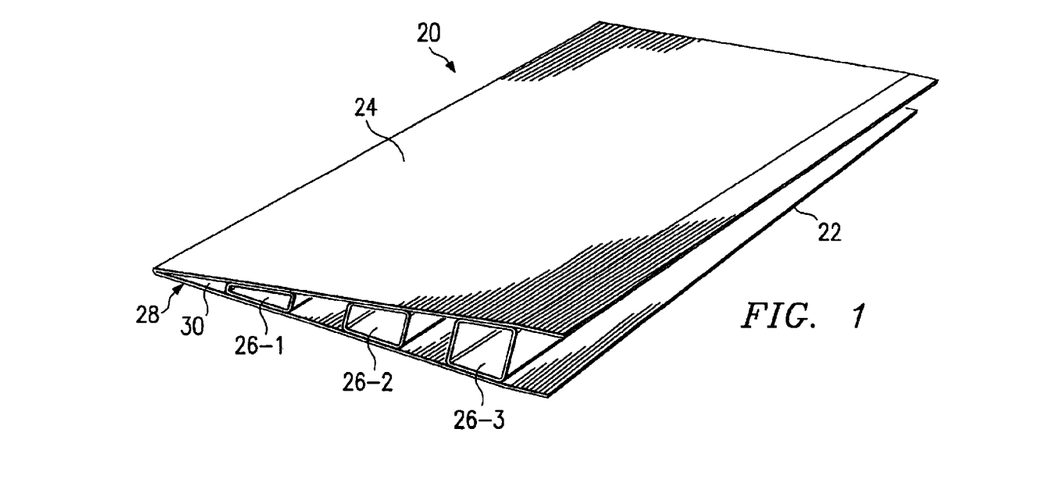
FIGS. 1 to 3 are generally schematic perspective views of embodiments of co-cured aerospace structures according to the present invention.

Referring to FIG. 1, the reference numeral 20 generally designates an aerostructure article constructed in accordance with a preferred embodiment of the invention. The article 20 is an advanced composite co-cured structure having a bottom skin 22, a top skin 24 and at least two (and usually several) elongated, laterally spaced-apart stiffener/spacer composite members 26-1, 26-2, and 26-3. The illustrated article 20 is in the general form of an airfoil, in which the skins 22 and 24 converge in a direction laterally of the stiffener/spacer members 26 and meet at an edge 28. An elongated wedge 30 of composite material stiffens and strengthens the edge 28.

Figure 2:
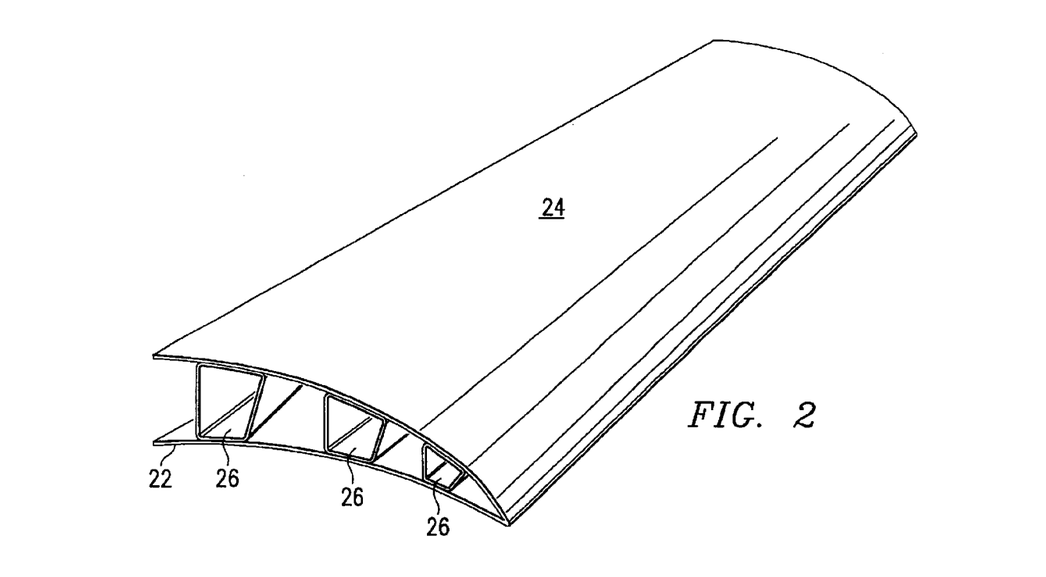
Figure 3:
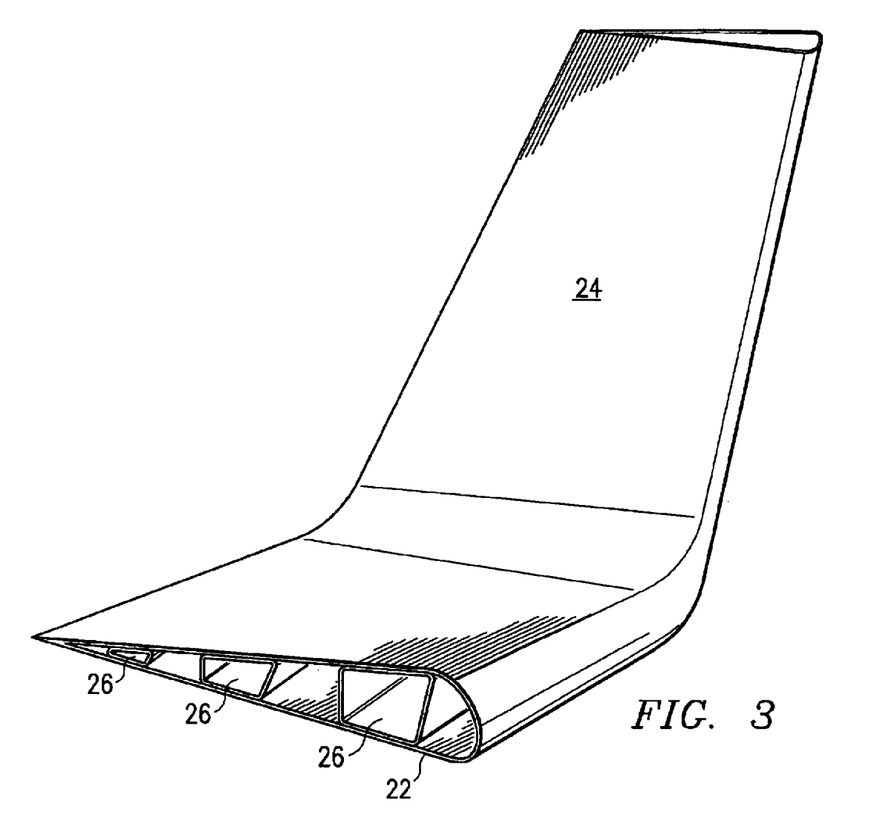

Aerostructure articles of the present invention may vary considerably in shape and application, as shown by the examples of FIGS. 2 and 3. In that regard, the skins may be curved laterally or longitudinally or both laterally and longitudinally and be spaced apart at varying distances along go their lateral and longitudinal extents. The stiffener/spacer members may be straight and either parallel or arranged at angles with one another, although they will usually be oriented generally longitudinally with respect to a center axis of the structure. The stiffener/spacer members may also have axes that are curved in the lateral direction or in the thickness direction of the structures or in both the lateral and thickness directions. The stiffener/spacer members may also be either of a uniform cross-sectional shape or a varying cross-sectional shape along their lengths. FIGS. 2 and 3 are merely illustrative of the possible variations in the configurations or aerostructures according to the present invention.

Figure 5A:
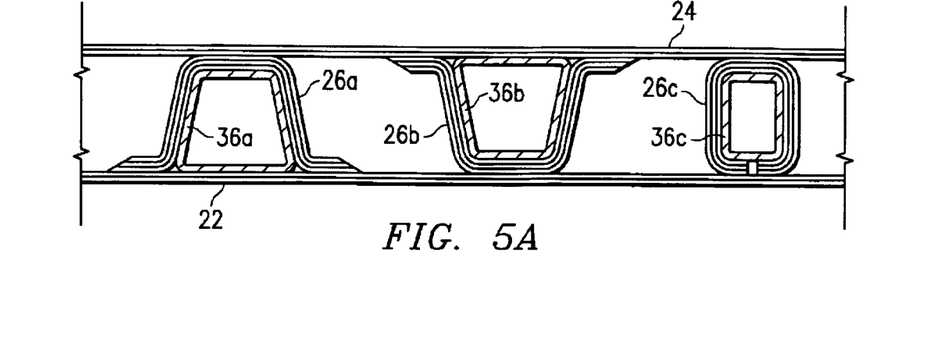
FIG. 5A is an end cross-sectional view of a portion of an aerospace structure embodying the present invention.

As may be best seen in FIG. 5A, common to all structures embodying the present invention are the skins 22 and 24 (for convenience, the skins are sometimes referred to herein as the "bottom skin" and the "top skins"), at least two stiffener/ spacer composite members 26, which may be generally hat-shaped in cross section or generally tubular in cross-section, and a "fly-away" hollow mandrel 36 that is received within each stiffener/spacer composite member and is used as a form for laying up an uncured resin-inmpregnated fiber material that forms the stiffener/spacer composite member of the co-cured structure.

Figure 6A:
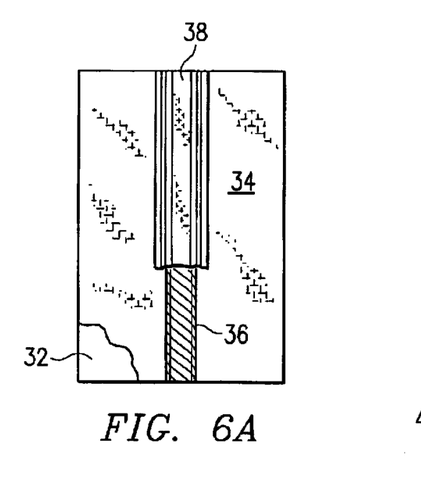
FIGS. 6A and 6B are generally schematic top plan views, showing the laying up of uncured composite layers on jigs at one stage in the fabrication of a composite structure according to the invention.
Figure 6B:
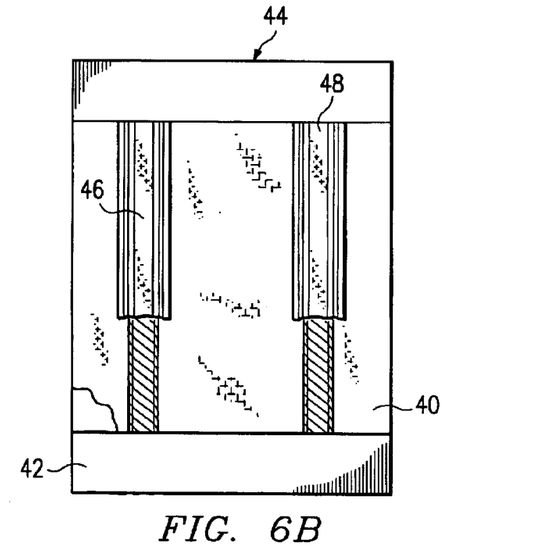
Figure 7:
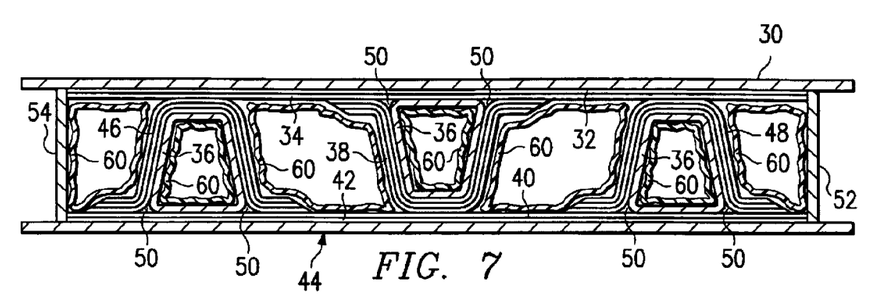
FIG. 7 is a schematic end elevational view that shows an uncured aerospace structure in place between jigs and with vacuum tube bags received in all hollow spaces of the structure.

Referring next to FIGS. 6A, 6B, and 7, the method of the present invention that is used to make the structures shown in FIGS. 1 to 3 and the virtually unlimited variants thereof will be described.

A top lay-up jig 30 (shown upside down in FIG. 6A in a position for assembling uncured composite layers) having a forming surface 32 of a shape complementary to the outer surface of the top skin 24 of the article 20 is provided for receiving a top lay-up assembly for subsequent co-curing. An uncured composite layer 34 is assembled on the forming surface 32 of the top lay-up jig 30. A release agent is applied to the surface 32 before the composite layer 34 is assembled. The uncured layer 34 has at least one uncured resin-impregnated laminate layer that is generally a graphite or aramid (???) fabric laminate layer and is termed a "pre-preg" in the advanced composite manufacturing industry. The uncured composite layer 34, which may have a plurality of uncured resin-impregnated laminate plies, provides the top skin 24 of the article 20.

Figure 4:
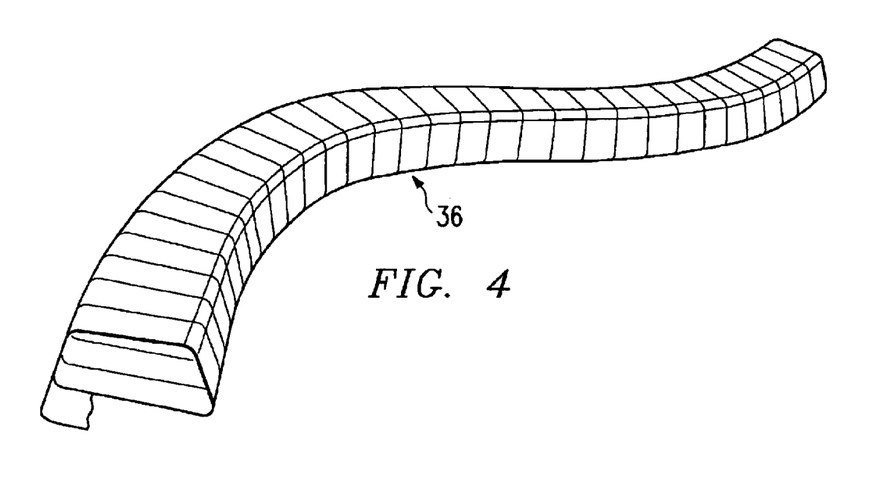
FIG. 4 is a perspective view of an example of a hollow mandrel that is used to support lay-ups of reinforcing/spacer composite members.

In the case of hat-shaped stiffener/spacer composite members (26a, 26b, FIG. 5A) a lightweight longitudinally extending hollow mandrel (36a, 36b) is secured to the composite layer 34 by a suitable uncured tacking adhesive, not shown, such as EA9689 made by The Dexter Corp., Hysol Aerospace Products, 2850 Willow Pass Road., P. O. Box 3123 Bay Point, Calif. The hollow mandrel 36 is, in effect, "tacked" to the layer 34 by the adhesive. As can be seen in FIG. 4, the hollow mandrel 36 is a pre-stiffened (cured), flexible, spirally-arranged shape that longitudinally extends along the top surface of the layer 34. The cross-sectional shape of the hollow mandrel 36 may be designed to provide optimal stiffening of a structure by the stiffener/ spacer composite members 26. A preferred cross-sectional form for the hollow mandrel 36 is trapezoidal, which usually provides the greatest strength, but other shapes, such as square, rectangular or rounded, may be provided as desired. The term "generally trapezoidal" is used broadly herein to include various shapes that resemble but are not true trapezoids. A desirable feature of the hollow mandrel 36 is that the cross-sectional shape may be varied along its length to provide a "hat section" to meet various needs. As may be seen in FIG. 4, the spiral wound configuration of the hollow mandrel 36 permits it to be flexed in both the lateral and thickness directions of the structure.

A pre-stiffened hollow mandrel 36 may be procured from AIRTECH International Inc., 2542 East Del Amo Blvd., P. O. Box 6207, Carson, Calif. The hollow mandrel 36 is pre-stiffened to the extent required to provide and maintain a desired configuration of an uncured composite layer that is assembled over it and will upon further fabrication of the article 20 become a stiffener/spacer composite member, as described hereinafter.

As FIGS. 5A, 6A and 6B show, hat-shaped stiffener/ spacer composite member (26a, 26b) are formed by laying up uncured resin-impregnated plies to form a layer 38 that extends over the top and side surfaces of the hollow mandrel 36 and over at least a portion of the composite layer 34 on either side of the mandrel 36. The layer 38 upon curing, as described below, provides a stiffener/spacer composite member 26 of generally hat-shaped cross-section, which consists of a generally U-shaped body portion having a base wall and side walls and side flange portions that extend laterally from the edge of each side wall of the body portion and that together form another base wall (FIG. 5A).

In a manner that is the same as that described above and shown in FIG. 6A, an uncured composite layer 40 is assembled on the forming surface 42 of a bottom lay-up jig 44 (see FIG. 6B). For reasons that are explained below, the bottom jig 44 has lateral and longitudinal dimensions that are greater than those of the layer 34 and of the top lay-up jig 30. Hollow mandrels 36 are secured to the surface of the layer 40 by an adhesive, and uncured composite layers 46 and 48 are laid up over the mandrels 36. The layers 46 and 48 upon curing will form stiffener/spacer composite members 26 of the structure. Both ends of the layer 40 and each of the mandrels 36 and the layers 46 and 48 are spaced apart from the end edges of the bottom jig 44 (see FIG. 6B). In structures in which the skins 22 and 24 meet at an edge, the uncured elongated wedge 30 of composite material that stiffens and strengthens the edge 28 is placed on the bottom uncured layer 40 (see FIG. 1).

Figure 5B:
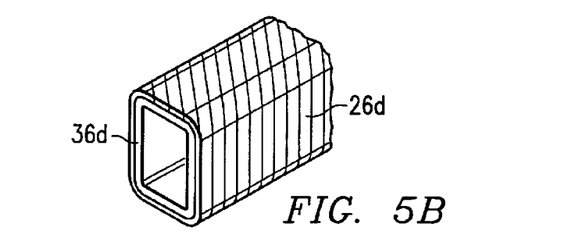
FIG. 5B shows strips of uncured composite material laid up on a mandrel that will in the completed structure form a tubular stiffener/spacer composite member.

Tubular stiffener/spacer composite member (26c) are formed by first laying up uncured composite material over a mandrel and then assembling the laid-up unit to one of the skin layers. Sheets or bands of composite material can be laid up on the mandrel to form a structure 26c over the mandrel having in cross section a U-shaped body and inturned flanges that form a small gap or a butt joint between their free ends. Tubular stiffener/spacer composite member (26d) can also be formed by spiral wrapping bands of uncured composite material over the mandrel, as shown in FIG. 5B.

The corners of the cross-sectional shape of the hollow mandrel 36 are not sharp but are rounded, as would be expected in the formation of the spirally wound hollow mandrel 36. While the strength of a stiffener/spacer composite member 26 fabricated with a hollow mandrel having rounded corners is adequate, the strength of such a stiffener/ spacer composite member can be improved by providing, in effect, fillets 50 along the longitudinal length of the edges of the top and bottom walls of the hollow mandrel 36. The fillets 50 may be advantageously provided by positioning a small roll of graphite fiber fabric material or a small roll of unidirectional material or longitudinally extending strands of such material in each small circumferentially extending gap at a juncture of a rounded corner of a hollow mandrel 36 and the uncured composite layers 34 and 40 (see FIG. 7). The graphite fiber material of the fillets 50 may either be uncured resin impregnated graphite material or a resin free graphite material.

The lay-up assemblies on the jigs 30 and 44 are then juxtaposed to form a sandwich between the jigs, as shown in FIG. 7. Side plates 52 and 54 are provided along the lateral edges of the jigs to support them in spaced-apart relation. When the skins 22 and 24 of the structure meet at an edge 28, no side plate is needed and the jigs can engage at that edge. The jigs are suitably connected to each other in the juxtaposed position.

Either before or after the jigs are juxtaposed and connected together to form a sandwich with the uncured composite layers and the mandrels, a flexible vacuum tube bag 60 is installed within each hollow mandrel 36, in each space between the composite layers laid up over the mandrels 36, and between the laterally outermost mandrels and the side plate(s) 52 (and 54) of the jig or the wedge 30, as the case may be.

As FIG. 3 shows, one of the skin layers may be laid up along a side portion of one of the jigs to form a side wall of the structure. In that case, a vacuum tube bag is inserted between the side wall of the structure and the adjacent stiffener/space composite member. The vacuum tube bags 60 extend continuously nearly the full length of the lower jig 42, thus leaving an end portion at each end of each vacuum tube bag that extends out several inches beyond the ends of the skin layers 34 and 40, the mandrels 36, and the layers assembled over the mandrels that will form the stiffener/spacer members of the finished structure (FIG. 7).

Figure 8:
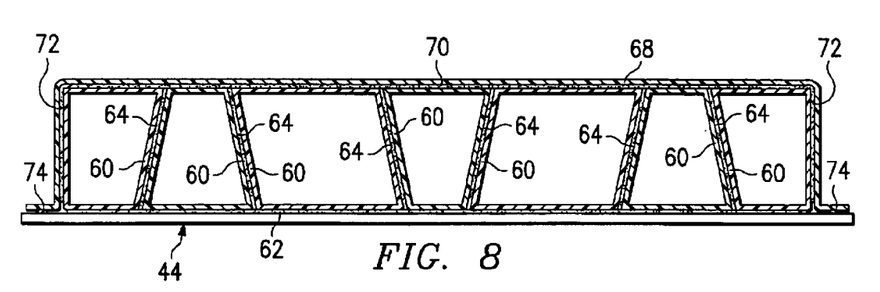
FIG. 8 is a schematic end elevational view that shows the sealing of the vacuum tube bags with a main vacuum bag.
Figure 9:
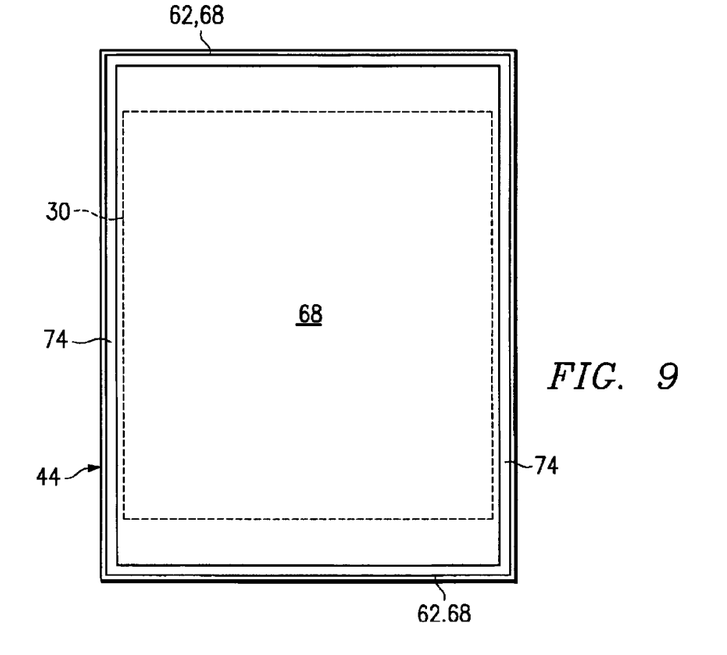
FIG. 9 is a top plan view of the vacuum-bagged assembly.

As shown schematically in FIG. 8, in which only the bottom jig 44, the vacuum tube bags 60 and a main vacuum bag 68 are shown, the bottom wall of each vacuum tube bag 60 is sealed to the top surface of the bottom jig 44 by a strip 62 of a suitable sealant tape. The side walls of each adjacent pair of vacuum tube bags 60 are sealed to each other by strips 64 of sealant tape. Next, the main vacuum bag 68 is placed over the top of the entire sandwich, i.e., over the top of the top jig 32 and the exposed end portions of the vacuum tube bags 60. The longitudinal ends of the main vacuum bag 68 are sealed to the top walls of all the tube bags 60 by strips 70 of sealant tape. The laterally outermost side walls of the vacuum tube bags adjacent the side plates of the jig are sealed to the main vacuum bag by strips 72 of sealant tape. Portions of the main vacuum bag 68 adjacent each lateral edge are folded down to lie outwardly of the end plates and are sealed by strips 74 of sealant tape to the bottom jig 42. At this stage, all layers of composite material in the sandwich are sealed within the tube bags 60 and the main vacuum bag 68, but both ends of each vacuum tube bag 60 are open to the environment. FIG. 9 shows the vacuum-bagged assembly in top plan, the sealing tapes being indicated by the hatched lines marked with the reference numerals. The sealing tape strips that join the sides of the vacuum tube bags are not shown or indicated but will be understood to run approximately perpendicular to the drawing sheet and intersect the shaded lines.

The bagged sandwich assembly is then evacuated, which pulls all of the vacuum tube bags 60 into engagement with all surrounding surfaces; to wit: the vacuum tube bags 60 within the mandrels 36 are sucked out to engage the inner surfaces of the mandrels; the vacuum tube bags 60 between the mandrels 36 and the uncured composite lay-ups over the mandrels engage the outer surfaces of the side walls of the lay-ups and the top and bottom composite layers 34 and 40.

The bagged and evacuated sandwich of the jigs and uncured layers is then placed in a suitable autoclave and subjected to a suitable curing cycle having an elevated temperature and elevated pressure over a desired time period to provide for curing of the composite skin layers 34 and 40 and the hat-shaped layers 38, 46 and 48 over the hollow mandrels 36 (and where present the wedge 30) into a unitary co-cured one piece structure. Inasmuch as all of the vacuum tube bags 60 are open at both ends to the atmosphere of the autoclave, all of the composite layers of the assembly are subjected to the pressure within the autoclave. The pressure acts outwardly on the top and bottom walls of the vacuum tube bags 60 on the skin composite layers 34 and 40, which compresses them against the inner forming surfaces 32 and 42 of the jigs 30 and 44. The pressure on the side walls of the vacuum tube bags 60 compresses the side walls of the lay-up composite layers 38, 46 and 48—the pressures on the side walls of the layers 38, 46, and 48 is balanced, so there is no tendency to deform the side walls.

Characteristically, an ultimate pressure of no greater than 45 psi may be used in the curing of an aerostructure article having a honeycomb core type hat section because of the possibility of crushing the core or causing dimpling of the plies overlying the core. In the practice of the method of the present invention the pressure in the autoclave can be increased to fall within a range of 45–70 psi for the curing cycle for resin impregnated graphite or aramid fabric material. Other higher pressures could be used for the curing cycle, as may be desired for other advanced composite materials. The use of an increased pressure provides for greater quality of the article and increased physical properties. The curing process will cause the resins of the hat-shaped composite pre-form layers 38, 46 and 48 to penetrate the graphite fabric material of the hollow mandrels 36 and the tacking adhesive to integrate and co-cure the mandrels with the layers 38, 46 and 48.

After the curing cycle has been completed in the autoclave, the sandwich assembly of the jigs and the now cured structure 20 is removed from the autoclave. The main vacuum bag 68 is removed, and the jigs are taken apart and separated from the structure. The vacuum tube bags are then pulled out of the hollow spaces. The structure 20 may then be trimmed for further use.

In the example of the method described above, hollow mandrels 36 and hat-shaped lay-ups 38, 46 and 48 of composite materials that will form stiffener/spacer members of the structure are assembled on both jigs 30 and 44. All of the mandrels 36 and the hat-shaped lay-ups 38, 46 and 48 may be assembled on the bottom jig 44—the orientation of the stiffener/spacer members is a matter of structural design. As mentioned above the cross-sectional shapes of each mandrel 36 and among the mandrels of an assembly may vary to meet the structural design requirements of the structure. Similarly, the mandrels may be straight and arranged parallel or at angles to each other, or they may be curved laterally or thickness-wise (or both). Needless to say, the number of stiffener/spacer composite members of the assembly may also vary.

The present disclosure includes that contained in the appended claims as well as that of the foregoing description. Although this invention has been described in some of its preferred forms with a certain degree of particularity, it is understood that the present disclosure of the preferred forms has been made only by way of example and that numerous changes in the details of construction and combination and arrangement of parts and method steps may be resorted to without departing from the spirit and scope of the invention.

What is claimed is:

1. A composite structure comprising first and second composite skin layers, each of a resin-impregnated fiber material, at least two elongated stiffener/spacer composite members, each of a resin-impregnated fiber material and interposed between the skin layers, each stiffener/spacer composite member being arranged generally longitudinally of the skin layers and the stiffener/spacer composite members being spaced apart laterally, each stiffener/spacer composite member having side walls extending between and united with the skin layers by base walls bonded to the inner faces of the skin layers, and an elongated hollow mandrel of a stiffened fabric received between and in engagement with the side walls of the of the stiffener/spacer composite member, and wherein the composite skin layers and stiffener/spacer composite members are co-cured under a predetermined pressure and a predetermined temperature to render the structure unitary.

2. The composite structure of claim 1, wherein at least one of the stiffener/spacer composite members is generally hat shaped in cross section and has a generally U-shaped body portion having said side walls and a side flange portion forming one of said base walls extending from the end of each of the side walls of the U-shaped body.

3. The composite structure of claim 1, wherein at least one of the stiffener/spacer composite members is tubular with the side walls joined by at least one of the base walls.

4. The composite structure of claim 3, wherein the at least one tubular stiffener/spacer composite member has a generally U-shaped body portion and in-turned flange portions forming one of the base walls.

5. The composite structure of claim 3, wherein the at least one tubular stiffener/spacer composite member is formed by helical plies of composite material wrapped around the mandrel.

6. The composite structure of claim 1, wherein each hollow mandrel is formed of a unitary stiffened carbon fabric tape.

7. The composite structure of claim 1, wherein at least one of the stiffener/spacer composite members is of uniform cross section along at least a portion of its length.

8. The composite structure of claim 1, wherein at least one of the stiffener/spacer composite members is of non-uniform cross section along at least a portion of its length.

9. The composite structure of claim 1, wherein both of the stiffener/spacer composite members are of non-uniform cross section along at least portions of their lengths.

10. The composite structure of claim 1, wherein at least a portion of one of the stiffener/spacer composite members has a longitudinal axis that is curved.

11. The composite structure of claim 1, wherein the width of at least one of the base walls of one of the stiffener/spacer composite members varies along at least a portion of its length.

12. The composite structure of claim 1, wherein the heights of the side walls of at least one of the stiffener/spacer composite members are different along at least portions of their lengths.

13. The composite structure of claim 1, wherein the height of at least one of the side walls of one of the stiffener/spacer composite members varies along at least a portion of its length.

14. The composite structure of claim 1, wherein the stiffener/spacer members converge longitudinally along a least portions of their lengths.

15. The composite structure of claim 1, wherein at least one of the skin layers is curved along at least a portion of its longitudinal extent.

16. The composite structure of claim 1, wherein at least one of the skin layers is curved along at least a portion of its lateral extent.

17. The composite structure of claim 1, wherein the top and bottom skin layers meet and are in engagement at a longitudinal edge juncture.

18. The composite structure of claim 17, and further comprising an elongated composite member of wedge-shape in cross section and of a resin-impregnated fiber material received between and engaged with portions of the top and bottom skin layers adjacent the edge juncture.

19. A composite structure comprising first and second composite skin layers, each of a resin-impregnated fiber material, at least two elongated stiffener/spacer composite members, each of a resin impregnated fiber material and interposed between the skin layers, each stiffener/spacer composite member being arranged generally longitudinally of the skin layers and the stiffener/spacer composite members being spaced apart laterally, each stiffener/spacer composite member having side walls extending between and united with the skin layers by base walls bonded to the inner faces of the skin layers, and an elongated hollow mandrel of a stiffened fabric received between and in engagement with the side walls of the of the stiffener/spacer composite member, wherein each hollow mandrel is formed of a unitary stiffened carbon fabric tape and wherein the composite skin layers and stiffener/spacer composite members are co-cured under a predetermined pressure and a predetermined temperature to render the structure unitary.

20. The composite structure of claim 19, wherein at least one of the stiffener/spacer composite members is generally hat-shaped in cross section and has a generally U-shaped body portion having said side walls and a side flange portion forming one of said base walls extending from the end of each of the side walls of the U-shaped body.

21. The composite structure of claim 19, wherein at least one of the stiffener/spacer composite members is tubular with the side walls joined by at least one of the base walls, and the at least one tubular stiffener/spacer composite member has a generally U-shaped body portion and in-turned flange portions forming one of the base walls.

22. The composite structure of claim 19, wherein at least one of the stiffener/spacer composite members is of non-uniform cross section along at least a portion of its length.

23. The composite structure of claim 19, wherein both of the stiffener/spacer composite members are of non-uniform cross section along at least portions of their lengths.

24. The composite structure of claim 19, wherein at least a portion of one of the stiffener/spacer composite members has a longitudinal axis that is curved.

25. The composite structure of claim 19, wherein the width of at least one of the base walls of one of the stiffener/spacer composite members varies along at least a portion of its length.

26. The composite structure of claim 19, wherein the heights of the side walls of at least one of the stiffener/spacer composite members are different along at least portions of their lengths.

27. The composite structure of claim 19, wherein the height of at least one of the side walls of one of the stiffener/spacer composite members varies along at least a portion of its length.

28. The composite structure of claim 19, wherein the stiffener/spacer members converge longitudinally along a least portions of their lengths.

29. A composite structure comprising p1 first and second composite skin layers, each of a resin-impregnated fiber material, at least two elongated stiffener/spacer composite members, each of a resin-impregnated fiber material and interposed between the skin layers, with each stiffener/spacer composite member being arranged generally longitudinally of the skin layers and the stiffener/spacer composite members being spaced apart laterally, each stiffener/spacer composite member having side walls extending between and united with the skin layers by base walls bonded to the inner faces of the skin layers, an elongated hollow mandrel of a stiffened fabric received between and in engagement with the side walls of the of the stiffener/spacer composite member, and wherein the composite skin layers and stiffener/spacer composite members are co-cured under a predetermined pressure and a predetermined temperature to render the structure unitary, and at least one of the stiffener/spacer composite members is generally hat shaped in cross section and has a generally U-shaped body portion having said side walls and a side flange portion forming one of said base walls extending from the end of each of the side walls of the U-shaped body.

30. A composite structure comprising first and second composite skin layers, each of a resin-impregnated fiber material, at least two elongated stiffener/spacer composite members, each of a resin-impregnated fiber material and interposed between the skin layers, each stiffener/spacer composite member being arranged generally longitudinally of the skin layers and the stiffener/spacer composite members being spaced apart laterally, with each stiffener/spacer composite member having side walls extending between and united with the skin layers by base walls bonded to the inner faces of the skin layers, an elongated hollow mandrel of a stiffened fabric received between and in engagement with the side walls of the of the stiffener/spacer composite member, and wherein the composite skin layers and stiffener/spacer composite members are co-cured under a predetermined pressure and a predetermined temperature to render the structure unitary, and at least one of the stiffener/spacer composite members is tubular with the side walls joined by at least one of the base walls.

31. The composite structure of claim 30, wherein the at least one tubular stiffener/spacer composite member has a generally U-shaped body portion and in-turned flange portions forming one of the base walls.

32. The composite structure of claim 30, wherein the at least one tubular stiffener/spacer composite member is formed by helical plies of composite material wrapped around the mandrel.

33. A composite structure comprising first and second composite skin layers, each of a resin-impregnated fiber material, at least two elongated stiffener/spacer composite members, each of a resin-impregnated fiber material and interposed between the skin layers, each stiffener/spacer composite member being arranged generally longitudinally of the skin layers and the stiffener/spacer composite members being spaced apart laterally, with each stiffener/spacer composite member having side walls extending between and united with the skin layers by base walls bonded to the inner faces of the skin layers, an elongated hollow mandrel of a stiffened fabric received between and in engagement with the side walls of the of the stiffener/spacer composite member, and wherein the composite skin layers and stiffener/spacer composite members are co-cured under a predetermined pressure and a predetermined temperature to render the structure unitary, and each hollow mandrel is formed of a unitary stiffened carbon fabric tape.

34. A composite structure comprising first and second composite skin layers, each of a resin-impregnated fiber material, at least two elongated stiffener/spacer composite members, each of a resin-impregnated fiber material and interposed between the skin layers, each stiffener/spacer composite member being arranged generally longitudinally of the skin layers and the stiffener/spacer composite members being spaced apart laterally, with each stiffener/spacer composite member having side walls extending between and united with the skin layers by base walls bonded to the inner faces of the skin layers, and an elongated hollow mandrel of a stiffened fabric received between and in engagement with the side walls of the of the stiffener/spacer composite member, and wherein the composite skin layers and stiffener/spacer composite members are co-cured under a predetermined pressure and a predetermined temperature to render the structure unitary, and at least one of the stiffener/spacer composite members is of non-uniform cross section along at least a portion of its length.

35. A composite structure comprising first and second composite skin layers, each of a resin-impregnated fiber material, at least two elongated stiffener/spacer composite members, each of a resin-impregnated fiber material and interposed between the skin layers, each stiffener/spacer composite member being arranged generally longitudinally of the skin layers and the stiffener/spacer composite members being spaced apart laterally, each stiffener/spacer composite member having side walls extending between and united with the skin layers by base walls bonded to the inner faces of the skin layers, and an elongated hollow mandrel of a stiffened fabric received between and in engagement with the side walls of the of the stiffener/spacer composite member, and wherein the composite skin layers and stiffener/spacer composite members are co-cured under a predetermined pressure and a predetermined temperature to render the structure unitary, and both of the stiffener/spacer composite members are of non-uniform cross section along at least portions of their lengths.

36. A composite structure comprising first and second composite skin layers, each of a resin-impregnated fiber material, at least two elongated stiffener/spacer composite members, each of a resin-impregnated fiber material and interposed between the skin layers, each stiffener/spacer composite member being arranged generally longitudinally of the skin layers and the stiffener/spacer composite members being spaced apart laterally, each stiffener/spacer composite member having side walls extending between and united with the skin layers by base walls bonded to the inner faces of the skin layers, and an elongated hollow mandrel of a stiffened fabric received between and in engagement with the side walls of the of the stiffener/spacer composite member, and wherein the composite skin layers and stiffener/spacer composite members are co-cured under a predetermined pressure and a predetermined temperature to render the structure unitary, and at least a portion of one of the stiffener/spacer composite members has a longitudinal axis that is curved.

37. A composite structure comprising first and second composite skin layers, each of a resin-impregnated fiber material, at least two elongated stiffener/spacer composite members, each of a resin-impregnated fiber material and interposed between the skin layers, each stiffener/spacer composite member being arranged generally longitudinally of the skin layers and the stiffener/spacer composite members being spaced apart laterally, each stiffener/spacer composite member having side walls extending between and united with the skin layers by base walls bonded to the inner faces of the skin layers, and an elongated hollow mandrel of a stiffened fabric received between and in engagement with the side walls of the of the stiffener/spacer composite member, and wherein the composite skin layers and stiffener/spacer composite members are co-cured under a predetermined pressure and a predetermined temperature to render the structure unitary, and wherein the width of at least one of the base walls of one of the stiffener/spacer composite members varies along at least a portion of its length.

38. A composite structure comprising first and second composite skin layers, each of a resin-impregnated fiber material, at least two elongated stiffener/spacer composite members, each of a resin-impregnated fiber material and interposed between the skin layers, each stiffener/spacer composite member being arranged generally longitudinally of the skin layers and the stiffener/spacer composite members being spaced apart laterally, each stiffener/spacer composite member having side walls extending between and united with the skin layers by base walls bonded to the inner faces of the skin layers, and an elongated hollow mandrel of a stiffened fabric received between and in engagement with the side walls of the of the stiffener/spacer composite member, and wherein the composite skin layers and stiffener/spacer composite members are co-cured under a predetermined pressure and a predetermined temperature to render the structure unitary, and the heights of the side walls of at least one of the stiffener/spacer composite members are different along at least portions of their lengths.

39. A composite structure comprising first and second composite skin layers, each of a resin-impregnated fiber material, at least two elongated stiffener/spacer composite members, each of a resin-impregnated fiber material and interposed between the skin layers, each stiffener/spacer composite member being arranged generally longitudinally of the skin layers and the stiffener/spacer composite members being spaced apart laterally, each stiffener/spacer composite member having side walls extending between and united with the skin layers by base walls bonded to the inner faces of the skin layers, and an elongated hollow mandrel of a stiffened fabric received between and in engagement with the side walls of the of the stiffener/spacer composite member, and wherein the composite skin layers and stiffener/spacer composite members are co-cured under a predetermined pressure and a predetermined temperature to render the structure unitary, and the height of at least one of the side walls of one of the stiffener/spacer composite members varies along at least a portion of its length.

40. A composite structure comprising first and second composite skin layers, each of a resin-impregnated fiber material, at least two elongated stiffener/spacer composite members, each of a resin-impregnated fiber material and interposed between the skin layers, each stiffener/spacer composite member being arranged generally longitudinally of the skin layers and the stiffener/spacer composite members being spaced apart laterally, each stiffener/spacer composite member having side walls extending between and united with the skin layers by base walls bonded to the inner faces of the skin layers, and an elongated hollow mandrel of a stiffened fabric received between and in engagement with the side walls of the of the stiffener/spacer composite member, and wherein the composite skin layers and stiffener/spacer composite members are co-cured under a predetermined pressure and a predetermined temperature to render the structure unitary, and the stiffener/spacer members converge longitudinally along a least portions of their lengths.

41. A composite structure comprising first and second composite skin layers, each of a resin-impregnated fiber material, at least two elongated stiffener/spacer composite members, each of a resin-impregnated fiber material and interposed between the skin layers, each stiffener/spacer composite member being arranged generally longitudinally of the skin layers and the stiffener/spacer composite members being spaced apart laterally, each stiffener/spacer composite member having side walls extending between and united with the skin layers by base walls bonded to the inner faces of the skin layers, and an elongated hollow mandrel of a stiffened fabric received between and in engagement with the side walls of the of the stiffener/spacer composite member, and wherein the composite skin layers and stiffener/spacer composite members are co-cured under a predetermined pressure and a predetermined temperature to render the structure unitary, and at least one of the skin layers is curved along at least a portion of its longitudinal extent.

42. A composite structure comprising first and second composite skin layers, each of a resin-impregnated fiber material, at least two elongated stiffener/spacer composite members, each of a resin-impregnated fiber material and interposed between the skin layers, each stiffener/spacer composite member being arranged generally longitudinally of the skin layers and the stiffener/spacer composite members being spaced apart laterally, each stiffener/spacer composite member having side walls extending between and united with the skin layers by base walls bonded to the inner faces of the skin layers, and an elongated hollow mandrel of a stiffened fabric received between and in engagement with the side walls of the of the stiffener/spacer composite member, and wherein the composite skin layers and stiffener/spacer composite members are co-cured under a predetermined pressure and a predetermined temperature to render the structure unitary, and at least one of the skin layers is curved along at least a portion of its lateral extent.

43. A composite structure comprising first and second composite skin layers, each of a resin-impregnated fiber material, at least two elongated stiffener/spacer composite members, each of a resin-impregnated fiber material and interposed between the skin layers, each stiffener/spacer composite member being arranged generally longitudinally of the skin layers and the stiffener/spacer composite members being spaced apart laterally, each stiffener/spacer composite member having side walls extending between and united with the skin layers by base walls bonded to the inner faces of the skin layers, and an elongated hollow mandrel of a stiffened fabric received between and in engagement with the side walls of the of the stiffener/spacer composite member, and wherein the composite skin layers and stiffener/spacer composite members are co-cured under a predetermined pressure and a predetermined temperature to render the structure unitary, and the top and bottom skin layers meet and are in engagement at a longitudinal edge juncture and the composite structure further comprises an elongated composite member of wedge-shape in cross section and of a resin-impregnated fiber material received between and engaged with portions of the top and bottom skin layers adjacent the edge juncture.

* * * * *